United States Patent

Matsui et al.

[11] 4,033,891
[45] July 5, 1977

[54] MAGNETIC PARTICLE POWDER OF ACICULAR FERRIC OXIDE USED FOR MAGNETIC RECORDING MATERIAL AND A PROCESS FOR PRODUCING THE SAME

[75] Inventors: Goro Matsui; Koji Toda; Shigeki Shimizu; Nanao Horiishi; Atushi Takedoi, all of Hiroshima, Japan

[73] Assignee: Toda Kogyo Corporation, Hiroshima, Japan

[22] Filed: Feb. 26, 1975

[21] Appl. No.: 553,325

[30] Foreign Application Priority Data

Mar. 1, 1974  Japan .............. 49-24519

[52] U.S. Cl. .................. 252/62.56; 423/634
[51] Int. Cl.$^2$ ........................ C01G 49/06
[58] Field of Search .............. 423/634, 151; 252/62.56

[56] References Cited

UNITED STATES PATENTS

| | | | |
|---|---|---|---|
| 3,075,919 | 1/1963 | Gruber et al. | 423/634 |
| 3,352,638 | 11/1967 | Perlowski et al. | 423/634 |
| 3,382,174 | 5/1968 | Hund | 423/634 |
| 3,620,841 | 11/1971 | Comstock | 423/633 |
| 3,897,354 | 7/1975 | Woditsch et al. | 252/62.56 |
| 3,912,646 | 10/1975 | Leitner et al. | 423/633 |
| 3,974,246 | 8/1976 | Chen et al. | 252/62.56 |

FOREIGN PATENTS OR APPLICATIONS

| | | | |
|---|---|---|---|
| 1,160,425 | 1/1964 | Germany | 423/634 |
| 1,803,783 | 8/1968 | Germany | 423/634 |
| 39-5009 | 1964 | Japan | 423/634 |
| 114,800 | 11/1974 | Japan | |
| 675,260 | 7/1952 | United Kingdom | 423/634 |

*Primary Examiner*—O. R. Vertiz
*Assistant Examiner*—Wayne A. Lange
*Attorney, Agent, or Firm*—Shlesinger, Arkwright, Garvey & Dinsmore

[57] ABSTRACT

The present invention relates to a process for producing magnetic particle powder of acicular ferric oxide used for a magnetic recording material comprising (A) reducing acicular goethite particle powder to obtain acicular magnetite particle powder, (B) heating said acicular magnetite particle powder and thereby making the partial pressure of oxygen in said acicular magnetite particle powder reach the equilibrium value and (C) oxidizing said acicular magnetite particle powder to obtain gamma-hematite (maghemite) particle powder, and magnetic particle powder produced thereby.

6 Claims, 2 Drawing Figures

MAGNETIC PARTICLE POWDER OF ACICULAR FERRIC OXIDE USED FOR MAGNETIC RECORDING MATERIAL AND A PROCESS FOR PRODUCING THE SAME

BACKGROUND AND SUMMARY OF THE INVENTION

The present invention relates to magnetic particle powder of acicular ferric oxide used for a magnetic recording material and a process for producing the same. The present invention relates particularly to magnetic particle powder of acicular ferric oxide suitable for a magnetic recording material of, for example, a magnetic tape or a magnetic disk used in magnetic recording such as audio recording, video recording or the like, and a process for producing the same.

In recent days, recording signals increasingly tends to be transferred into the short wave length range, thereby demanding an improvement of a high frequency characteristic of a magnetic recording material and thus particularly demanding an intensive coercive force of magnetic particle powder of ferric oxide used as a magnetic recording material.

As conventionally known, a typical process for preparing magnetic particle powder comprises, for example as disclosed in Japanese patent publication No. 7776/1951, reducing acicular goethite particle powder as the starting material to obtain magnetite particle powder, oxidizing said maghemite particle powder and thereby obtaining gamma-hematite (maghamite) particle powder retaining the acicular shape of the starting material.

Further, the following three kinds of ordinary methods for improving the coercive force of gamma-hematite (maghemite) particle powder have been proposed.

A. A method for increasing the coercive force comprising increasing the shape anisotropic energy of magnetic particle powder by increasing the axis ratio (long axis/short axis) of each acicular magnetic particle.

B. A method for increasing the coercive force comprising increasing the crystal anisotropic energy of each magnetic particle by adding metal other than iron e.g. nickel thereto.

C. A method for increasing the coercive force comprising making close the crystal organization of each acicular magnetic particle.

The present invention relates to the abovementioned ordinary method (C), which is based on the following view.

In the conventional method comprising reducing acicular goethite particle powder as the starting material to obtain magnetite particle powder and then oxidizing said magnetite particle powder and thereby obtaining acicular gamma-hematite (maghemite) particle powder, it is unavoidable that holes are formed inside the particles during the reducing and oxidizing steps as has been already reported.

Therefore, the crystal organization of produced particles becomes rough, which results in hindering the improvement of magnetic characteristics, especially of the coercive force.

From this reason, various kinds of proposals have been made from the standpoint that making close of the crystal organization of magnetic particles can improve the magnetic characteristics thereof. The conventional methods belonging to the abovementioned method (C) are, for example, as follows.

A method comprising reducing magnetic ferric oxide at a low temperature to obtain $Fe_3O_4$ and then annealing the same at a temperature of 800° – 1000° C under such a condition as does not change the composition of $Fe_3O_4$.

Japanese patent publication No. 26156/1963

A method comprising reducing acicular ferric oxide at a temperature of 300° – 500° C in reducing gas (to the state FeOx; X<1) and then oxidizing the same in an oxidizing atomosphere to FeOx with X>1.3.

Japanese patent publication No. 5009/1964

However, according to the abovementioned conventional methods it is difficult to produce on an industrial scale magnetic particle powder of acicular ferric oxide having a high coercive force as required today to be used for a magnetic recording material.

Further, as well-known, magnetic particle powder of acicular ferric oxide used for a magnetic recording material e.g. for a magnetic tape, a magnetic disk or the like requires not only excellent magnetic characteristics but also powder characteristics e.g. an excellent orientation within a coating film and a sufficient evenness on the coating surface in case of being formed into a magnetic coating using resins as a binder. However, according to conventionally proposed processes for producing magnetic particle powder of ferric oxide it has been difficult to obtain magnetic particle powder of ferric oxide having sufficient powder characteristics.

An object of the present invention is to provide magnetic particle powder of acicular ferric oxide having a high coercive force suitable for a magnetic recording material, and a process for producing the same.

Another object of the present invention is to provide an industrially simple and new process for producing said magnetic particle powder of ferric oxide having excellent powder characteristics.

The abovementioned objects of the present invention are achieved by a process of the present invention as summarized below.

A process for producing magnetic particle powder of acicular ferric oxide used for a magnetic recording material according to the present invention comprises A. reducing acicular goethite particle powder to obtain acicular magnetite particle powder;

B. heating said acicular magnetite particle powder at 200° – 800° C in a heating atmosphere in which the partial pressure of oxygen is controlled at 0.001 – 1% by weight and thus making the partial pressure of oxygen of said magnetite particle powder reach the equilibrium value under said condition; and C. oxidizing said heat-treated acicular magnetite particle powder to obtain gamma-hematite (maghemite) particle powder retaining the acicular shape of the starting material.

Another process for producing magnetic particle powder of ferric oxide according to the present invention comprises the abovementioned process wherein said acicular goethite particle powder as the starting material includes 0.01 – 1.0 % by atom of Cr component with respect to Fe component contained therein.

DETAILED DESCRIPTION OF THE INVENTION

Figure 1:
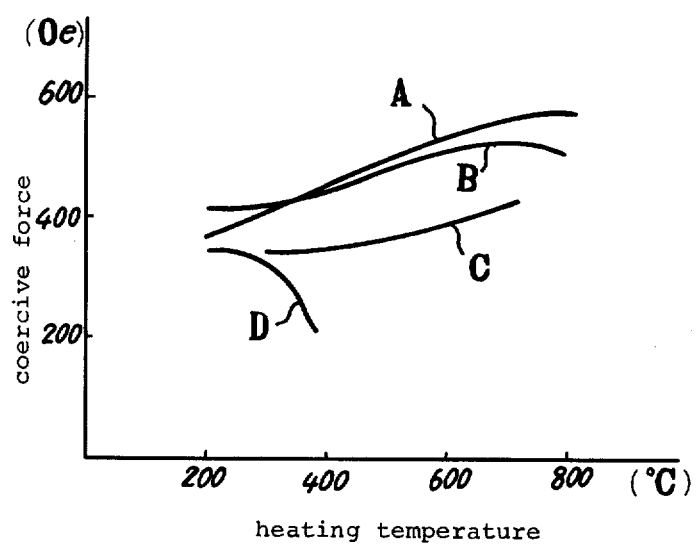
FIG. 1 is a graph representing the relation between the heating temperature in a heating treatment in the examples of a process according to the present invention and the coercive force of gamma-hematite particle powder as the final product.

The inventors have long studied on magnetic particle powder of ferric oxide for a magnetic recording material.

The present invention is based on the inventors' following knowledge on a process for producing gamma-hematite (maghemite) particle powder having a high coercive force.

In case of reducing acicular goethite particle powder as the starting material to obtain magnetite particle powder and then oxidizing said magnetite particle powder to obtain gamma-hematite (maghemite) particle powder retaining the crystal shape of the starting material according to the conventional process, the obtained gamma-hematite (maghemite) particle powder has a coercive force of 400 Oe at most, or ordinarily below 400 Oe.

It is thought that it is not only because the crystal organization of the particle is rough but because the construction of the crystal lattice thereof is imperfect of ununiform and thus the static magnetic energy thereof is small.

Said roughness of the crystal organization of the particles and said imperfectness or ununiformity of the crystal lattice thereof are thought to result from the partially ununiform concentration of iron ion ($Fe^{2+}$, $Fe^{3+}$) and oxygen ion ($O^{2-}$) of magnetite particles which are the precursor of gamma-hematite (maghemite) particles. In fact, as reported in a prior document ("Powder Engineering" Aug. 1970, "Characteristics of reduced metal powder (1)"), a reaction of reducing goethite particle powder to obtain magnetite particle powder takes a ununiform and partial progress because it is a solid phase-gaseous phase reaction. And as well-known, since magnetite is an intermediate product between metal iron and iron oxide when seen in the chemical composition thereof, it is extremely difficult to strictly control the progress of said reducing reaction.

From these and other reasons, the concentration of iron ion and oxide ion of the magnetite particle powder is apt to be partially ununiform.

According to the present invention, a surprising fact is proved that by heating a magnetite particle having ununiform or imperfect crystal lattice arrangement and rough crystal structure at an appropriate temperature and besides by positively dispersing oxygen ion having larger diameter than iron ion in said particle, the crystal lattice thereof is re-arranged, resulting in an effective achievement of uniform crystal lattice arrangement and close crystal organization.

In other words, by heating a magnetite magnetite particle in an atmosphere in which the partial pressure of oxygen is controlled, oxygen is emitted from the crystal lattice thereof and moved thereinto and then reaches to the equilibrim state where the amount of oxygen in the particle is equivalent to that corresponding to the equilibrim partial pressure according to Gibb's phase rule, whereby the crystal lattice is perfectly or uniformly rearranged and at the same time the crystal organization is made close.

Based on the abovementioned knowledge, the inventors have completed a process for producing magnetic particle powder of acicular ferric oxide used for a magnetic recording material.

The reacting conditions for each step in a process according to the present invention are now described below.

1. Reacting conditions for Step (B)

The step (B) is the most important step in a process according to the present invention. In this step, the amount of oxygen in acicular magnetite particles reaches the value equivalent to the predetermined equilibrium partial pressure of oxygen. The heating temperature in this step is within a range of 200 – 800° C.

By heating at a temperature below 200° C re-arrangement of the crystal lattice of the magnetite particles and making close of the crystal organization thereof are not effectively achieved, so that the coercive force of the produced gamma-hematite (maghemite) particles is not improved. Further, when the starting material is ordinary acicular goethite particle powder, the higher is the heating temperature in an atmosphere where the partial pressure of oxygen is within such a range that magnetite particles are not oxidized to become gamma-hematite (maghemite) particles the more effectively the crystal lattice is re-arranged and the crystal organization becomes close, whereby the more improved is the coercive force of gamma-hematite (maghemite). This is because entropy of oxygen gas is larger than that of oxygen in an oxide, and the equilibrium partial pressure of oxygen in an oxide increases as the temperature rises whereby re-arrangement of the crystal lattice takes place as the temperature rises.

However, in case that the starting material is an ordinary acicular goethite particle powder and the heating temperature in this step is above 800° C, other factors have remarkable effects on decreasing the coercive force of gamma-hematite particle powder as the final product, thus compensating the effect of improving the coercive force due to a temperature rise. As well-known, in case of reducing ordinary acicular goethite particle powder to obtain acicular magnetite particle powder, a rise of reducing temperature in said reducing reaction is apt to decrease the axial ratio of the obtained acicular magnetite particles, which results in decrease of the coercive force based on shape anisotropic energy. Said decrease of the axial ratio of an acicular magnetite particle results from growing of the particle by heating, but this phenomenon occurs not only in a reducing reaction but always in heating an acicular magnetite particle. Therefore, in case of practising a process according to the present invention with using ordinary goethite particle powder as the starting material, the upper limit of the heating temperature in the step (B) has to be 800° C. And the partial pressure of oxygen in the atmosphere during the heating treatment in this step is within a range of 0.001 – 1% by weight.

In case that the partial pressure of oxygen is below 0.001% by weight, a very high temperature is required for making the amount of oxygen in magnetite particles to reach the equilibrim value, which is unfavorable not only from an economical stand point but from the fact that the axial ratio is decreased due to said high temperature as abovementioned.

Further, if there is excessive oxygen in the atmosphere during the heating step, a rapid oxidization of magnetite particles occurs and the magnetite particles become gamma-hematite (maghemite) particles before the partial pressure of oxygen in the magnetite particles reaches the equilibrium value, so that the re-arrangement of the crystal lattice and the making close of the crystal organization are not effected. Therefore, the partial pressure of oxygen has to be normally below 1% by weight.

For controlling the partial pressure of oxygen in the heating atmosphere, applied can be, for example, a method comprising reducing the pressure in the container, a method comprising mixing stoichiometrically predetermined amounts of magnetite particles and oxygen and sealing the same within the container, a method using a mixed gas consisting of an inert gas and oxygen or the like. Industrially, it is the most convenient to use a cylinder nitrogen gas. The generally available cylinder nitrogen gas includes 5 - 100 ppm of oxygen as impurity, and by controlling the amount of nitrogen flow by means of a container with one end open the purpose is easily achieved and a special device is not necessarily required therefor.

The time of heating treatment in this process is that taken till the equilibrium state is achieved. Said time changes according to the partial pressure of oxygen in the atmosphere and the heating temperature. For example, when the partial pressure of oxygen in the atmosphere is 0.001 - 0.01% by weight, normally about 180 minutes are sufficient.

2. Reacting conditions for Step (A)

This step for reducing acicular goethite particle powder as the starting material to obtain acicular magnetite particle powder can be carried out under the conventional conditions. For example, said goethite particle powder may be reduced in a stream of hydrogen at a temperature of 300 - 400° C.

3. Reacting conditions for Step (C)

This step for oxidizing the magnetite particle powder obtained by the step (B) to obtain gamma-hematite (maghemite) particle powder can be also carried out under the conventional conditions. For example, said magnetite particle powder may be oxidized in the air (the partial pressure of oxygen is about 23.2 % be weight) at a temperature of about 200 - 300° C.

Conditions in another process according to the present invention are now described below.

In case of reducing acicular goethite particle powder to obtain acicular magnetite particle powder or heating acicular magnetite particle powder, the higher the heat-treating temperature is, the more decreased is the axial ratio of the acicular magnetite particles heated as abovementioned. However, according to the present invention, a surprising fact has been found that in case of dehydrating acicular goethite particle powder to obtain alpha-hematite particle powder, reducing acicular goethite particle powder to obtain acicular magnetite particle powder or heating said acicular magnetite particle powder, if each particle contains 0.01 - 1.0% by atom of Cr component with respect to Fe component in said particle, the growth of the particle is effectively inhibited in the heating treatment, whereby the decrease of the axial ratio of each particle is prevented.

The present invention is based also on this finding.

The fact has not theoretically explained yet that if Cr component is present in an iron oxide particle to be heated or reduced, the growth of said particle is inhibited and the axial ratio of said particle is not decreased. According to a prior art, it is reported that when an acicular goethite particle is reduced nearly at 400° C, the axial ratio of the produced acicular goethite particle is decreased.

On the contrary, according to the present invention, if Cr component is present in a an iron oxide particle be treated, decrease of the axial ratio is not recognized even if the heat-treating temperature is above 800° C as shown in the belowmentioned examples, and it is extremely remarkable that Cr has an effect of inhibiting a particle from growing.

In a process according to the present invention, the range of Cr content in an acicular goethite particle as the starting material is decided on the basis of the fact that if the amount of Cr component is below 0.01% by atom with respect to Fe component in the particle it has a small effect of inhibiting the particle from growing and of preventing decrease of the axial ratio thereof, while if more than 1.0% by atom of Cr component is present, the purity of resulting gamma-hematite (maghemite) particle is lowered, thereby making it difficult to obtain a gamma-hematite particle having excellent magnetic property. As abovementioned, the effect of Cr component of inhibiting a particle from growing is recognized not only in the step (A) of reducing acicular goethite particle powder to obtain acicular magnetite particle powder but also in the step (B) of heating acicular magnetite particle powder. Therefore, Cr component may be present first in the latter step (B), but since decrease of the axial ratio occurs in the former step (A) it is preferable that the acicular goethite particles of the starting material contain Cr component from the beginning. Cr containing acicular goethite particles according to the present invention involve not only acicular goethite particles having Cr component therein but also the particles to the surface of which Cr compounds is attached. Chrome oxide attached to the surface of the latter acicular goethite particles penetrates into the particles and is dispersed therein in the steps of reducing said particles [step (A)] and of heating acicular magnetite particles obtained by said reducing step [step (B)], and therefore said particles become the same with the former particles.

Conditions for each of said steps (A) (B) and (C) according to the present invention in case that the starting material is Cr containing acicular goethite particles are the same as abovementioned. However in this case, the upper limit of the temperature in the step (A) can be as high as about 500° C, and if the upper limit of the temperature in the step (B) is above 800° C, decrease of the axial ratio of the particles can hardly be recognized. But, too high a heat-treating temperature in the step (B) is not preferable from an economical viewpoint. And in order to obtain gamma-hematite (maghemite) particle powder having a high coercive force which is the object of the present invention, a high temperature above 800° C is not required and a temperature at 800° C or below is sufficient.

In a process according to the present invention, in case that the starting material is Cr containing acicular goethite particle powder, obtained are gamma-hematite (maghemite) particle powder having especially excellent powder characteristics. In case that said particles are formed into a magnetic coating film using resins as a binder, an extremely excellent orientation is recognized in said film, which seems to be due to the fact that the presence of Cr component substantially prevents sintering between the particles and therefore the particles are completely separated from each other in the film.

Conditions and effects thereby in a process according to the present invention are now described below on the basis of the data obtained from the examples and the reference examples of the present invention to be mentioned below.

FIG. 1 represents the relation of the heating temperature and the coercive force of gamma-hematite (maghemite) particles of the final product, in which the ordinate represents the coercive force with the abscissa the heating temperature.

A curve A in the figure represents the results of heating acicular magnetite particles containing 0.2% by atom of Cr component with respect to Fe component in a nitrogen gas atomosphere in which the partial pressure of oxygen is 0.01 % by weight, said results corresponding to the belowmentioned Examples 1 – 7.

A curve B in the figure represents the results of heating acicular magnetite particles not containing Cr component in a nitrogen gas atomosphere in which the partial pressure of oxygen is 0.01 % by weight, said results corresponding to the belowmentioned Examples 8 – 14.

A curve C in the figure represents the results of heating acicular magnetite particles containing 0.2% by atom of Cr component with respect to Fe component in a nitrogen gas atmosphere in which the partial pressure of oxygen is 0.001% by weight, said results corresponding to the belowmentioned Examples 15 – 19.

Further, a curve D in the figure is provided for the purpose of comparison and represents the results of heating acicular magnetite particles containing 2% by atom of Cr component with respect to Fe component in the air where the partial pressure of oxygen is about 23.2 % by weight, said results corresponding to the belowmentioned Reference examples 1 – 4.

As apparent from FIG. 1, preferable conditions for the step (B) in a process according to the present invention are 300 – 700° C of heating temperature and 0.01% by weight of the partial pressure of oxygen in case of the starting material being ordinary acicular goethite particle powder not containing Cr component, and 400° – 800° C of heating temperature and 0.01% by weight of the partial pressure of oxygen in case of the starting material being acicular goethite particle powder containing Cr component (in this case, acicular magnetite particle powder to be heated contain Cr component, of course).

It is understood from the curve D that in case of heating the particles in the air without controlling the partial pressure of oxygen, when the heating temperature rises above about 300° C the coercive force of the particles suddenly decrease even if the particles contain Cr component. This is because non-magnetic alpha-hematite is produced by oxidizing magnetite particles at a temperature above 300° C in the air.

Figure 2:
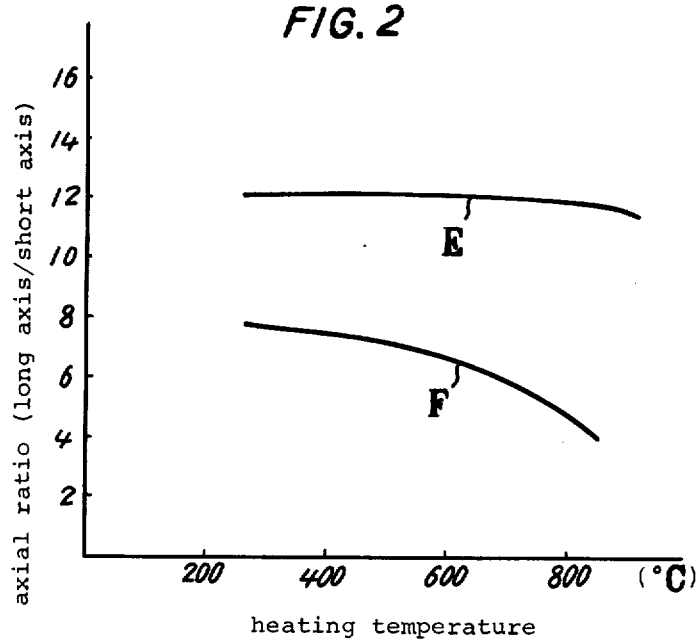
FIG. 2 is a graph representing the relation between the heating temperature in a heating treatment in the examples of a process according to the present invention and the axial ratio of gamma-hematite particle powder as the final product.

FIG. 2 represents the relation between the heating temperature and the axial ratio of a gamma-hematite (maghemite) particle which is the final product, in which the ordinate represents the axial ratio with the abscissa the heating temperature.

A curve E in the figure represents the results under the same conditions with those of the curve A in FIG. 1, said results corresponding to the belowmentioned Examples 1 – 7.

A curve F in the figure represents the results under the same conditions with those of the curve B in FIG. 1, said results corresponding to the belowmentioned Examples 8 – 14.

From FIG. 2 it is understood that in case of the starting material being acicular goethite particle powder containing Cr component (in this case acicular magnetite particle powder to be heated also contains Cr component, of course) the axial ratio does not decrease if the heating temperature is above about 800° C, while in case of the starting material being acicular goethite particle powder not containing Cr component the axial ratio begins to decrease at about 500° C and remarkably decreases above about 800° C.

Further, reviewing FIGS. 1 and 2 together, the following important knowledge is obtained.

In case of the starting material containing Cr component (the curve A in FIG. 1 and the curve E in FIG. 2), rise of the heating temperature does not cause the axial ratio to decrease but keep at about 12, and in spite thereof the coercive force increases.

In case of the starting material not containing Cr component (the curve B in FIG. 1 and the curve F in FIG. 2), rise of the heating temperature decreases the axial ratio, but the coercive force increases till the temperature reaches about 800° C.

These facts indicate that a factor other than shape anisotropic energy effects the improvement of the coercive force. Further, these facts entirely supports the inventors' view that due to perfect or uniform rearrangement of the crystal lattice and making close of the crystal organization of gamma-hematite (maghemite) particles, said particles have been converted into particles having magnetic structure of high static magnetic energy.

According to the present invention as described above, obtained can be magnetic particle powder of ferric oxide having a high coercive force which is highly suitable for a magnetic recording material.

Further, since said magnetic particle powder of ferric oxide according to the present invention has excellent powder characteristics, a coating film having an excellent surface smoothness can be obtained by forming said powder in a magnetic coating film using resins as a binder.

This is due to the fact that the perfect or uniform rearrangement of the crystal lattice and making close of the crystal organization have the effect of making the particle surface even and besides, in case of the particles containing Cr component, the dispersing property of the particles are improved, and other facts.

The present invention is further described in detail with reference to the following non-limiting Examples and Reference examples.

EXAMPLE 1

Step for preparing acicular goethite particle powder to be used as the starting material containing 0.2% by atom of Cr component with respect to Fe component contained therein:

Ferrous sulfate comprising 800 mol of Fe component and chromium sulfate $Cr_2(So_4)_3$ comprising 1.6 mol of Cr component were dissolved in water so as to make 500l of aqueous solution. While stirring this solution at a temperature of 20° to 25° C, 410l of 7.8N NaOH and then water was added to make 1,000l in total of aqueous solution. Colloidal solution of ferrous sulfate containing 0.2% by atom of Cr component with respect to Fe component was thereby obtained. Maintaining the temperature of this colloidal solution at around 40° C, air was introduced thereinto at a rate of 1,600l/min to form yellow precipitation.

By filtering off this yellow precipitation from the mother liquid, washing the particles with water and drying the same at 100° C, 71,500g of yellow powder was separated.

Said yellow powder consisted of acicular goethite particles each having a means diameter of 0.6μ long axis and 0.04μ short axis and thus an axial ratio (long axis/short axis) of about 15/1. The mother liquid after filtering the precipitation and wasted water after washing was analyzed by using a spectrometer but no Cr was detected. Therefore said acicular goethite particle powder contained 0.2% by atom of Cr component with respect to Fe component contained therein.

Step for producing acicular magnetite particle powder by reducing acicular goethite powder used as the starting material [Step (A)];

22,000g of said acicular goethite powder was put in a retort container with one open. Said powder was subjected to heat for 180 minutes at a temperature of 480° C in a stream of hydrogen, while continuously rotated.

19,000g of black magnetic powder was thereby obtained through this reduction process.

Said black magnetic powder consisted of acicular magnetite particle.

Heat treatment Step for acicular magnetic particle powder [Step (B)];

1,000g of said acicular magnetite powder was put in a retort container with one end open. While rotating said container, nitrogen containing 80 ppm of oxygen as introduced thereinto at a rate of 750 ml/min. and the container was heated for 180 minutes at a temperature of 200° C wherein the partial pressure of oxygen was maintained at around 0.01% by weight.

Step for producing gamma-hematite particle powder as the final product by oxidizing acicular magnetite particle powder produced in the Step (B) [Step (C)]:

After completing heat treatment step (B) as mentioned above, the temperature of the magnetite powder was raised to 250° C and air was introduced into the container instead of nitrogen containing 80 ppm of oxygen, while continuously rotated and the partial pressure of oxygen therein being kept at around 23.2% by weight.

1,030g of red-brown magnetic powder was thereby obtained by this oxidization process.

Said red-brown magnetic powder consisted of gamma-hematite particles each having a mean diameter of 0.48μ long axis and 0.04μ short axis and thus an axial ratio of about 12/1.

Said gamma-hematite particle powder was observed under the electron microscope. It was found that each particle retained the acicular crystal shape of acicular goethite particle as the starting material and that the surface of each particle was even.

Then magnetic characteristics of said gamma-hematite particle powder were measured. The coercive force was 388 Oe and the maximum residual magnetism was 43.1 emu/g.

EXAMPLES 2 – 7

By changing the temperature of heat treatment during the foregoing heat treatment step for acicular magnetite powder (B) to 300° C, 400° C, 500° C, 600° C, 700° C and 800° C, gamma-hematite particle powder was obtained in the same manner as in Example 1.

The magnetic coercive force and the maximum residual magnetism were as shown in the Table attached. The magnetic coercive force and the axis ratio of gamma-hematite particle obtained in Examples 1 – 7 were shown by the curve A in FIG. 1 and the curve E in FIG. 2.

EXAMPLE 8

Step for preparing acicular goethite particle powder not containing Cr component within the acicular goethite particle used as the starting material:

500l of ferrous sulfate containing 450 mol of Fe was maintained at a temperature of 20° to 25° C, while stirring the same, 450l of 4.8N NaOH and then water was added thereto to make 1,000l in total of colloidal solution of ferrous hydroxide. Subsequently subjecting the resulting colloidal solution to a temperature at 45° C, air was introduced thereinto at a rate of about 800l /min to produce yellow precipitate in the solution.

The yellow precipitate was filtered off from the mother liquid, washed with water and dried at 100° C, whereby 40,000g of yellow powder was obtained.

Said yellow powder consisted of acicular goethite particles each having a mean diameter of 0.45μ long axis and 0.03μ short axis and thus an axis ratio (long axis/short axis) of about 14/1.

Step for producing acicular magnetite particle powder by reducing acicular goethite particle powder as the starting material (Step (A));

10,000g of said acicular goethite particle powder was put in a retort container with one end open.

Said powder was reduced in a stream of hydrogen for 180 minutes at 350° C, while continuously rotated, 8,680g of black magnetic powder was thereby obtained through this reduction process.

Said black magnetic powder consisted of acicular magnetite particles.

Heat treatment step for acicular magentite particle powder (step (B));

1,000g of said acicular magnetite particle powder was put in a retort container with one end open. While rotating said container, nitrogen containing 80 ppm of oxygen was introduced thereinto at a rate of 750 ml/min.

The container was then heated for 180 minutes at 200° C, wherein the partial pressure of oxygen was kept at around 0.01% by weight.

Step for producing gamma-hematite particle powder as the final product by oxidizing acicular magnetite particle powder (Step (C));

After heat treatment process as mentioned above, the temperature of the magnetite powder was raised to 250° C and air was introduced into the container instead of nitrogen containing 80 ppm of oxygen, while continuously rotated and the partial pressure of oxygen being kept at around 23.2% by weight. This oxidization process was continued for 120 minutes to produce 1,027g of red-brown magnetic powder.

Said red-brown magnetic powder consisted of gamma-hematite particles each having a mean diameter of 0.4μ long axis and 0.05μ short axis and thus an axial ratio of 8/1.

Through the observation of said gamma-hematite particle powder under the electron microscope it was found that each particle retained the acicular crystal shape of the acicular goethite particle as the starting material and that the surface of each particle was even. As for magnetic characteristics of said gamma-hematite particle powder, the coercive force was 418 Oe and the maximum residual magnetism was 42.7 emu/g.

EXAMPLES 9 – 14

By changing the heating temperature of acicular magnetite particle powder during the foregoing heat treatment step to 300° C, 400° C, 500° C, 600° C, 700° C and 800° C, gamma-hematite particle powder was obtained in the same manner as in Example 8.

The coercive force and the maximum residual magnetism of each gamma-hematite particle powder was as shown in the Table attached. The curve F in FIG. 2 shows the axis ratio.

EXAMPLES 15 – 19

Gamma-hematite particle powder was obtained in the same manner as in Example 1 except that the partial pressure of oxygen in the nitrogen gas atomosphere during heat treatment step for acicular magnetite particle powder was kept at 0.001% by weight and the heating temperature was changed to 300° C, 400° C, 500° C, 600° C and 700° C.

The coercive force and the maximum residual magnetism of each gamma-hematite particle powder was as shown in the Table attached. The curve C in FIG. 1 shows the coercive force measured.

EXAMPLE 20

Step for preparing acicular goethite particle powder as the starting material containing 0.6% by atom of Cr component with respect to Fe component contained therein:

50$l$ of aqueous solution composed of ferrous sulfate containing 45 mol of Fe component, chromium sulfate $Cr_2(SO_4)_3$ containing 0.27 mol of Cr component and water was prepared. While stirring the said solution at a temperature of 20–25° C, 4.5$l$ of 4.6N NaOH and then water was added to make 100$l$ in total of solution. Thereby colloidal solution of ferrous hydroxide containing 0.06% by atom of Cr component with respect to Fe component was obtained.

Subsequently while maintaining the resulting colloidal solution at around 45° C, air was introduced thereinto at a rate of about 300$l$/min. to produce yellow precipitate.

This yellow precipitate was filtered off from the mother liquid, washed with water and dried at 100° C to form 4,050g of yellow powder.

Said yellow powder consisted of acicular goethite particles each having a mean diameter of 0.6$\mu$ long axis and 0.05$\mu$ short axis and thus an axial ratio of 12/1.

The mother liquid after filtering the precipitation and the waste water after washing was analyzed by a spectrophotometer and no Cr component was detected. Said acicular goethite particle powder therefore contained 0.6% by atom of Cr component with respect to Fe component.

Step for producing acicular magnetite particle powder by reducing acicular goethite particle powder as the starting material [Step (A)]:

1,200g of the said acicular goethite particle powder was put in a retort container with one end open. Said powder was heated in a stream of hydrogen for 180 minutes at 500° C while continuously rotated to produce black magnetic powder.

Said black magentic powder resulted from this reduction process consisted of acicular magnetite particle.

Heat treatment step for acicular magnetite particle powder [Step (B)]:

Said acicular magnetite particle powder was put in a retort container with one end open. While rotating said container, nitrogen containing 80 ppm of oxygen was introduced therein at a rate of 1,500 m$l$/min. The powder was heated for 120 minutes at 750° C, the partial pressure of oxygen in the container being kept at around 0.02% by weight.

Step for producing gamma-hematite particle powder as the final product by oxidizing acicular magnetite particle powder [Step (C)]:

After completing heat treatment as mentioned above, the temperature of the magnetite powder was lowered to 250° C and air was introduced therein instead of nitrogen containing 80 ppm of oxygen, while continuously rotated and the partial pressure of oxygen being kept at around 23.2% by weight. This oxidization process was continued for 120 minutes to produce 1,040g of red-brown magnetic powder.

Said red-brown magnetic powder consisted of gamma-hematite particles each having a mean diameter of 0.4$\mu$ long axis and 0.03$\mu$ short axis and thus an axis ratio of about 12/1.

Observing said gamma-hematite particle powder under the electron microscope, it was found that each particle retained the acicular crystal shape of the acicular goethite particle as the starting material and that the surface of particle was even.

As for magnetic characteristics of said gamma-hematite particle powder measured, the coercive force was 450 Oe and the maximum residual magnetism was 43.5 emu/g.

EXAMPLE 21

Step for preparing acicular goethite particle powder as the starting material containing 0.12% by atom of Cr component with respect to Fe component contained therein:

4,070g of the acicular goethite particle powder, obtained from the "Step for preparing acicular goethite particle powder not containing Cr component within the acicular goethite particle powder used as the starting material" in Example 8, was suspended in water to prepare 180$l$ of the suspension. 200m$l$ of chromium sulfate $Cr_2(SO_4)_3$ solution containing 0.05 mol of Cr was added to said suspension and then stirred for 120 minutes, during which the temperature was held at 35° C. The resulting precipitation was filtered off and dried at 100° C to form yellow powder consisted of acicular goethite particles on the surface of which Cr ions were attached.

pH of the mother liquid after filtering and separating the precipitation was 6.5. The wasted water after filtration was analyzed by using a spectrophotometer but no Cr was detected. Therefore said acicular goethetite particle powder contained Cr ions attached thereon having 0.12% by atom of Cr component with respect to Fe component therein.

Step for producing acicular magnetite particle powder by reducing acicular goethite particle powder as the starting material (Step (A)).

1,200g of said acicular goethite particle powder was put in the same container as used in the Example 20. Said powder was heated for 180 minutes in a stream of hydrogen at 350° C, while rotated, to produce black magnetic powder. Said black magnetic particle powder produced by this reduction process consisted of acicular magnetite particle powder.

Heat treatment step for acicular magnetite particle powder (Step (B));

Said acicular magnetite particle powder was put in a retort container with one end open. While rotating said container, nitrogen containing 80 ppm of oxygen was introduced therein at a rate of 15 l/min. Then said container was subjected to heat at 500° C for 90 minutes, the partial pressure of oxygen in the container being kept at around 0.20% by weight. Step for producing gamma-hematite particle powder as the final product by oxidizing acicular magnetite particle powder [Step (C)];

After the heat treatment as mentioned above, the temperature of magnetite powder was lowered to 250° C and while rotating the container, air was introduced into the container instead of nitrogen containing 80 ppm of oxygen, the partial pressure of oxygen therein being kept at about 23.2% by weight. This oxidization process was continued for 120 minutes to produce 1,045g of brown-red magnetic powder.

Said brown-red magnetic powder consisted of gamma-hematite particles each having a mean diameter of 0.36μ long axis and 0.036μ of short axis and thus an axial ratio of about 10/1.

Said gamma-hematite particle powder was observed under the electron microscope and it was found that each particle retained the acicular crystal shape of the acicular goethite particle as the staring material and that the surface of each particle was even.

As for magnetic characteristics of said gamma-hematite particle powder measured, the coercive force was 428 Oe and the maximum residual magnetism was 43.5 emu/g.

EXAMPLE 22

Step for preparing acicular goethite particle powder as the starting material containing 0.3% by atom of Cr component with respect to Fe component therein;

3240g of acicular goethite particle powder, which was obtained by the "Step for preparing acicular goethite particle powder as the starting material not containing Cr component therein" described in Example 8, was suspended in water to prepare 180l of suspension. 280ml of water solution of chromium sulfate $Cr_2(SO_4)_3$ containing 0.1 mol of Cr was added thereto. Then the suspension was stirred for 120 minutes while the temperature thereof held at 50° C. Then the precipitate was filtered off and dried at 100° C, whereby yellow powder was obtained. Said yellow powder consisted of acicular goethite particles to the surface of which Cr ions were attached. pH of the mother liquid after filtering the precipitation was 6.0. Said filtered liquid was analysed by a spectrophotometer, but Cr component was not detected. It involved that to said acicular goethite particles attached were Cr ions having 0.3% by atom of Cr component with respect to Fe component contained therein.

Step for reducing acicular goethite particle powder as the starting material to obtain acicular magnetite particle powder [Step (A)]:

1,200g of the abovementioned acicular magnetite particle powder was put in a retort container with one end open. Said container was rotated and nitrogen containing 80 ppm oxygen was introduced therein at a rate of 10l/min. Said container was heated at 600° C for 200 minutes with the partial pressure of oxygen in the container held 0.20% by weight.

Step for oxidizing acicular magnetite particle powder to obtain gamma-hematite particle powder as the final product [Step (C)]:

After said heating step was completed, the temperature of the magnetite powder was controlled at 270° C, and the container was rotated.

By introducing air instead of nitrogen containing 80 ppm oxygen into the container (in this case the partial pressure of oxygen therein was about 23.2% by weight) oxidization was carried out for 100 minutes, whereby 1,050g of red-brown magnetic powder was obtained.

Said red-brown magnetic powder consisted of gamma-hematite particles each having a mean particle diameter of 0.4μ long axis and 0.033μ short axis and thus an axial ratio of about 12/1.

Observing said gamma-hematite particle powder under the electron microscope, each particle retained the acicular crystal shape of the starting material and had the even surface.

Measuring the magnetic characteristics of the gamma-hematite particle powder, the coercive force was 436 Oe and the maximum residual magnetism was 42.5 emu/g.

REFERENCE EXAMPLE 1

Acicular goethite particle powder was obtained by Steps "for preparing acicular goethite particle powder as the starting material containing 0.2% by atom of Cr component with respect to Fe component contained therein" and "for producing acicular magnetite particle powder by reducing acicular goethite powder" as described in Example 1.

1,000g of said magnetite particle powder was put in the same container with one end open as used in Example 1 and the container was rotated. Air was introduced into the magnetite at a rate of 750 ml/min, and the container was heated at 200° C for 60 minutes (to carry out oxidization), whereby 1,025g of red-brown magnetic powder was obtained. The partial pressure of oxygen in the container then was 23.2% by weight.

Said red-brown magnetic powder consisted of gamma-hematite particles each having a mean diameter of 0.48μ long axis and 0.04μ short axis and thus an axial ratio of 12/1.

Observing the gamma-hematite particle powder under the electron microscope, each particle relatively retained the acicular crystal shape of the goethite particle as the starting material and had the even surface.

Measuring the magnetic characteristic of the particle powder, the coercive force was 370 Oe and the maximum residual magnetism was 43.5 emu/g.

REFERENCE EXAMPLES 2 – 4

The same operation as in Reference example 1 was carried out except that the temperature in heating acicular magnetite particle powder was changed to 300° C, 350° C and 400° C. By x-ray diffraction of the product in each Reference example, diffraction line was obtained only with respect to gamma-hematite in Reference example 2, while that line of the mixture of gamma-hematite and alpha-hematite was obtained in Reference examples 3 and 4.

The magnetic characteristics in each Reference example were as shown in the appended Table, while the relation between the heating (oxidizing) temperature and the coercive force of the obtained particle powder was shown by a curve D in FIG. 1.

equilibrium value according to Gibb's phase rule under said conditions.

| | producing condition | | | | characteristic value | |
|---|---|---|---|---|---|---|
| | oxygen partial pressure | treating temperature | treating time | oxidizing temperature | coercive force | maximum residual magnetism |
| | (wt. %) | (° C) | (min) | (° C) | (Oe) | (emu/g) |
| Example | | | | | | |
| 1 | 0.01 | 200 | 180 | 250 | 388 | 43.1 |
| 2 | " | 300 | " | " | 415 | 43.0 |
| 3 | " | 400 | " | " | 450 | 43.5 |
| 4 | " | 500 | " | " | 488 | 42.3 |
| 5 | " | 600 | " | " | 523 | 43.0 |
| 6 | " | 700 | " | " | 535 | 43.3 |
| 7 | " | 800 | " | " | 540 | 42.6 |
| 8 | " | 200 | " | " | 418 | 42.7 |
| 9 | " | 300 | " | " | 431 | 43.0 |
| 10 | " | 400 | " | " | 452 | 42.5 |
| 11 | " | 500 | " | " | 485 | 41.8 |
| 12 | " | 600 | " | " | 517 | 42.0 |
| 13 | " | 700 | " | " | 530 | 43.5 |
| 14 | " | 800 | " | " | 512 | 40.1 |
| 15 | 0.001 | 300 | " | " | 370 | 43.0 |
| 16 | " | 400 | " | " | 375 | 43.3 |
| 17 | " | 500 | " | " | 383 | 44.2 |
| 18 | " | 600 | " | " | 415 | 42.8 |
| 19 | " | 700 | " | " | 430 | 41.5 |
| 20 | 0.02 | 750 | 120 | 250 | 450 | 43.5 |
| 21 | 0.20 | 500 | 90 | 250 | 428 | 43.0 |
| 22 | 0.14 | 600 | 200 | 270 | 436 | 42.5 |
| Reference example | | | | | | |
| 1 | 23.2 | 200 | 60 | | 370 | 43.5 |
| 2 | " | 300 | " | | 370 | 43.0 |
| 3 | " | 350 | " | | 350 | 41.3 |
| 4 | " | 400 | " | | 230 | 24.1 |

What is claimed is:
1. In the production of acicular gamma-ferromagnetic iron oxide from acicular goethite, wherein the acicular goethite is reduced to acicular magnetite and the resultant magnetite is oxidized to gamma-hematite retaining the particle shape of the starting material, the improvement for obtaining gamma-hematite having improved magnetic properties which comprises heating the acicular magnetite obtained from the reduction of the acicular goethite, prior to subjecting it to oxidation, at a constant temperature in the range of 200°–800° C in an inert gas atmosphere having a partial pressure of oxygen controlled at a constant value in the range of 0.001–1% by weight and for the time sufficient to make the partial pressure of the acicular magnetite reach the equilibrium value according to Gibb's phase rule under said conditions.

2. The process of claim 1, in which the material is heated at a constant temperature in the range of 300°–700° C.

3. The process of claim 1, in which the material is heated at a constant temperature in the range of 600°–700° C.

4. The process of claim 1, in which the acicular goethite as starting material contains 0.01–1.0 atomic % of Cr component with respect to Fe component contained therein.

5. The process of claim 4, in which the acicular goethite as starting material contains 0.1–0.5 atomic % of Cr component with respect to Fe component contained therein.

6. The process of claim 4, in which the material is heated at a constant temperature in the range of 400°–800° C.

* * * * *